Figure 1:
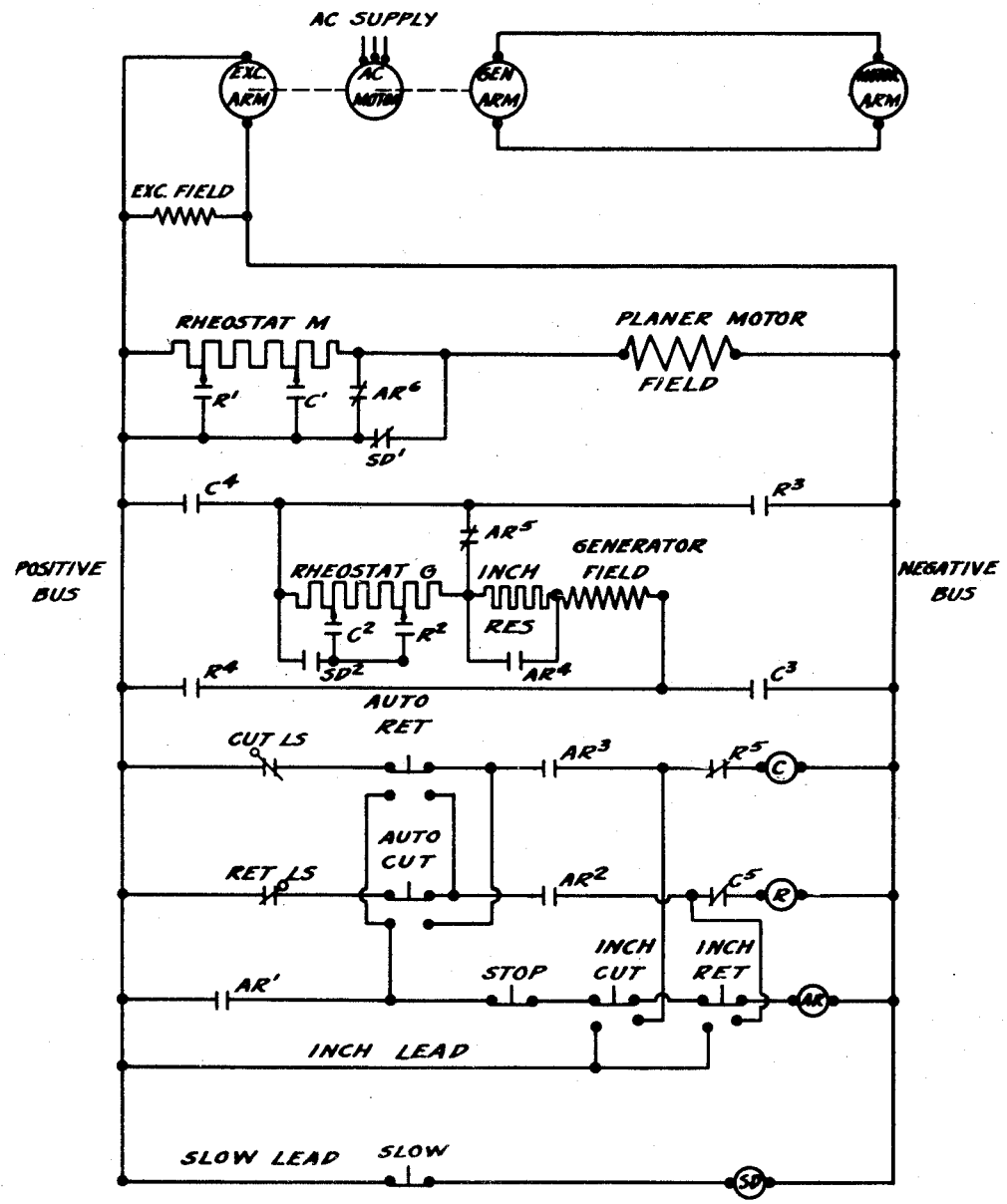

UNITED STATES PATENT OFFICE 2,422,476

ELECTRIC CONTROL FOR PLANERS AND THE LIKE

John E. Doran, Cincinnati, Ohio, assignor to The G. A. Gray Company, Cincinnati, Ohio, a corporation of Ohio Application June 21, 1945, Serial No. 600,715

6 Claims. (Cl. 172—239)

The modern high speed metal planer is driven by a direct current motor, supplied by an individual separately excited generator driven by an alternating current motor. An unusually wide speed range is obtained on the direct current motor by controlling the field of the generator and alternately controlling the field of the direct current planer motor. Reversal of the direct current planer motor is accomplished by reversing the generator field. The speeds in the cutting and return directions are made independently adjustable by means of two rheostats, one for the cut direction and one for the return direction. The rheostats are usually of the combination type, which have part of the resistance in series with the field of the generator and another part of the resistance of this same rheostat in the field of the planer motor. Thus if the speed of the planer motor is increased from the lowest speed to the highest speed, the resistance is first shunted out in successive steps from the generator field and resistance is then inserted in successive steps into the circuit of the planer motor field.

Complete manual control of the planer motor is invested in a five button pendant station where the buttons are marked Auto. cut, Auto. ret., Inch cut, Inch return, and Stop. Stroke limit switches operated by dogs adjustably mounted on the planer table automatically reverse the planer motor when the machine is in automatic operation. The dog opens the limit switch when the table is moving in one direction and then closes the switch to reset it, when the table moves in the opposite direction. Automatic operation of the table is started by pressing either the Auto. cut button or the Auto. ret. button.

The inching buttons are for causing the table to move in either direction at a fixed moderate speed for set-up operations and for setting and checking tools. The inching buttons are always ready to function and will take the control away from the automatic operation at any time. The planer motor will always stop quickly when the inching button is released even though it may have been in automatic operation at the time the inching button was depressed. The stop button operates to quickly bring the planer motor to rest, if the button is depressed while the machine is in automatic operation.

It is well known that the economical cutting speed for machining metals is determined by the type of cutting tools, the hardness of the material to be cut, and is also greatly effected by sand holes in castings as well as by scale inclusions in forgings. The slower the cutting speed, the less injurious is the effect on the cutting tool. It is also well known that stopping and starting in the cut is injurious to cutting tools and should be avoided.

Heretofore, castings with hard spots or with sand or scale inclusions were machined at much lower speeds than castings free from defects, in order to eliminate time-consuming tool changes. Where a single hard spot occurred, it was possible for the operator to press his inch cut button when the hard spot approached the cutting tool, thereby taking the control away from the automatic and operate the inching speed during the rest of the cutting stroke. At the end of the cut stroke, the operator would release the inch cut button and the table would stop. The operator would then shift to the Auto. ret. button and start automatic operation on the return stroke. This method of operation not only would lose time, but also the inching speed was usually too high to effect the maximum saving in the tool life.

It is desirable in connection with such an electric drive system to be able to slow the operation of the table to a very slow speed without taking the control away from the automatic drive. This is unlike the inching control, which as already noted takes the control away from the automatic drive, so that the automatic drive must be started up again after the inching operations are concluded. My invention is an improved control which permits the operator of a planer to preselect the most economical table speeds for machining a work piece, assuming no hard spots or defects in the material and then by means of manual control, cause the table to move at very slow speeds when the tool passes through selected defective points and to resume normal speed after the defective point has been safely passed.

In operation, the operator puts a chalk mark around the sand hole for the hard spot in the work piece to identify the defects. An additional push button switch is provided in the pendant station marked Slow, which the operator depresses when the chalk mark approaches the cutting tool, causing the table to quickly slow down to a very slow speed, while the tool cuts through the danger point. When the operator releases the button, the table resumes its normal speed as predetermined by the setting of the rheostat. This control not only saves time by permitting the machine to operate at full capacity for the large percentage of the work, but also saves time by reducing the number of tool changes required and also saves tool steel.

It is to the end of providing electrical controls for such a very slow momentary speed without interruption of the automatic reversing drive that the present invention is directed.

Figure 2:
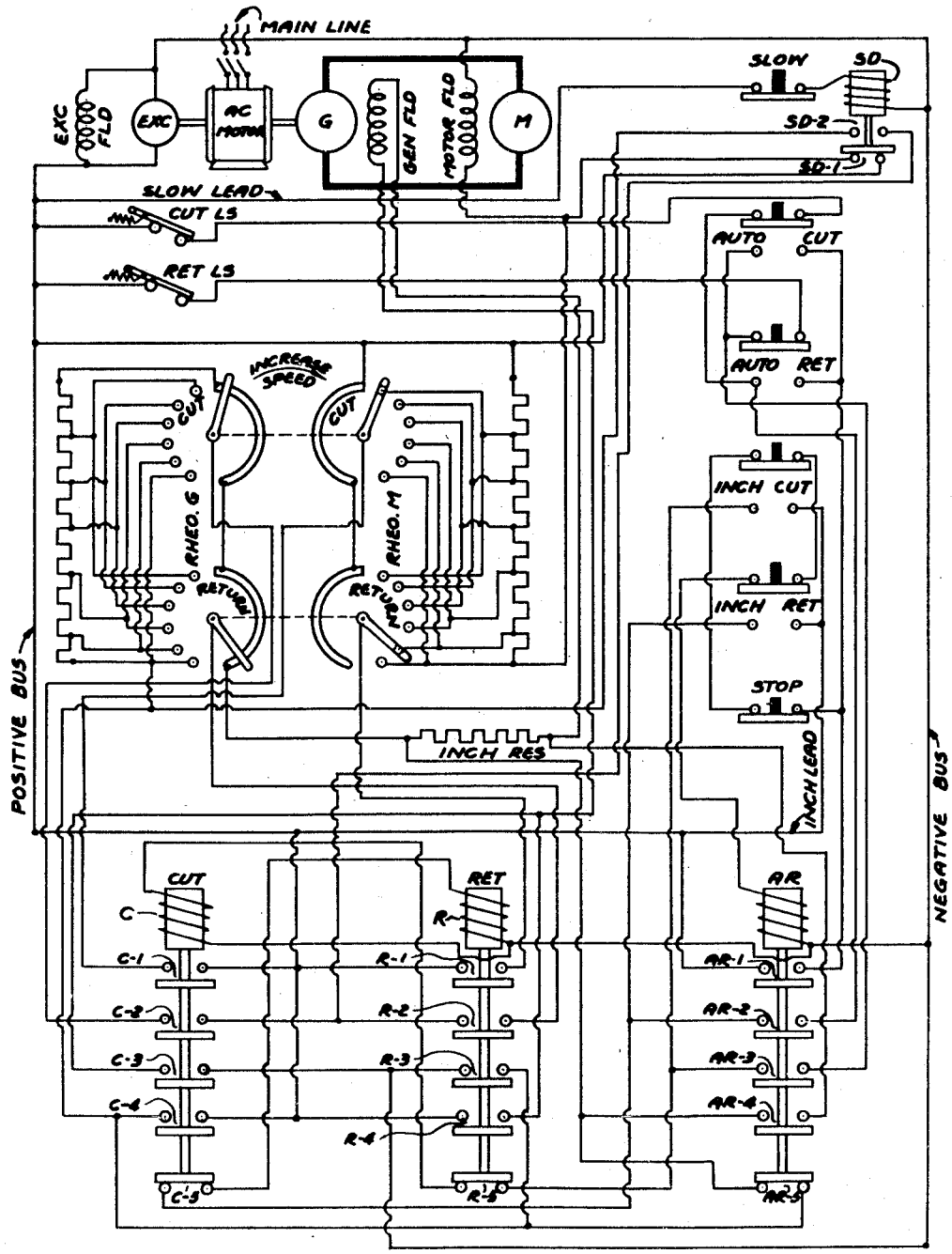

In the drawing,

Fig. 1 is a schematic electrical diagram in which certain symbols are used which will now be stated:

Fig. 2. is an electrical diagram wherein mechanically related parts are grouped together.

Solenoids which are used to operate banks of switches in the system are indicated by a small diameter ring and are lettered the same way as the switches which are controlled by the solenoids. The switch contacts bear numeral suffixes to identify one switch from another operated by the same solenoid. Thus there is a solenoid marked AR which operates on switches marked AR with a numeral. There is also a solenoid marked R and one marked C which operate respectively switches marked R and C with a numeral. The added structure to accomplish the object of this invention is solenoid SD, and switches marked SD with a numeral. There is also added a manual switch marked Slow.

Ordinary switches, i. e., ones which are solenoid operated and spring biased to open position so that they open up when the solenoid is deprived of current are shown by two parallel lines. Switches which are operated by their solenoids to keep them open and which will close by springs when their solenoids are deprived of currents are additionally indicated with an added diagonal line. Switches which are manually controlled are indicated by a horizontal line and a vertical line with the contacts shown as round dots. All of such switches are spring biased to their position as illustrated. There are in addition two switches which are operated by dogs clamped to the table. These switches are shown with two parallel lines, a diagonal line and a ring at the end of the diagonal line.

In the diagrams, motors and generators are indicated by conventional symbols as are the other elements of the system. In each diagram the control system is shown de-energized, as indicated by open switch marked "Main line," Fig. 2.

For a given voltage on its armature, the planer motor will operate at its slowest speed when the minimum resistance is connected in series with its field. Thus when switch SDI is closed, the rheostat M in the circuit of the planer motor field will be short-circuited. Otherwise when switch SDI is held open, only part of the resistance is shorted by switches RI or CI, whichever is closed. Switch marked CI is closed for the cutting stroke and switch marked RI is closed for the return stroke. Work may be done in either or both directions.

The generator field is supplied as shown through rheostat G. The inch resistance marked Inch res. in series with the rheostate G is normally by-passed by the switch AR4 during automatic operation. During inching operation, however, the Inch res. is inserted in series with the generator field but the open condition of switch AR4 and Rheostat G is by-passed by the closed condition of switch AR5. This fixed resistance causes a predetermined constant voltage to be applied to the planer motor armature during the inching operation. Similarly rheostat M is passed by switch AR6, causing the planer motor to operate with maximum field strength during the inching operation.

During automatic operation, the Inch res. is shunted out by the closed position of switch AR4, and rheostat G is inserted in series with the generator field by the open position of AR5. Switch SD2 is closed by the SD solenoid shunting out preselected portions of the rheostat G depending on whether C2 is closed or R2 is closed. Similarly rheostat M is inserted in series with the motor field circuit by the opening of switch AR6 and by the open position of switch SDI, which results from the solenoid SD being energized. Thus when the switch marked Slow is pressed to open its contacts depriving solenoid SD of current, causing switch SDI to close and SD2 to open, the Generator field will have the maximum resistance in its circuit and the motor field will have the minimum resistance in its circuit, which combination results in the slowest possible stable operating speed of the planer motor.

To start the planer table into automatic operation, the operator depresses either the switch marked Auto ret. or the switch marked Auto. cut. Either one of these switches as shown in the diagram is always effective, provided the table had not reached its limit of travel in that direction as determined by the position of the table dog, thus causing the Cut. L. S. (or Ret. L. S.) to be opened. If the limit switch is opened, the manual switch which normally starts automatic motion in that direction will be inoperative. The Inch buttons, however, are always operative regardless of the position of the stroke limit switches. Also, one manually operated switch for a automatic operation is always effective because obviously the table cannot be at both limits of travel at the same time.

With the execiter energizing the bus bars thus opening switch SDI and closing SD2 and with all other switches in the position as shown in diagram, a depression of the Auto. ret. switch will couple contacts which receive current from the positive bus through the return limit switch, thence through the normally closed contacts of the manually operated Auto. cut. switch, through the now temporarily closed contacts of the Auto. ret. switch, through the Stop switch and the normally closed contacts of both inch switches, through solenoid AR to the negative bus. Solenoid AR becomes energized causing contacts AR1, AR2, AR3 and AR4 to close and contacts AR5 to open. When AR2 closes, solenoid R immediately is energized by current flowing from the positive bus, through Ret. L. S., Auto. cut, contacts AR2, contacts C5, through solenoid R to the negative bus. The closing of R3 and R4 energizes the generator field which then supplies energy to the motor armature and causes the planer table to operate in the return direction. The closing of contacts R1 and R2 causes the speed to be that which was predetermined by the setting of the rheostats. In actual practice rheostats R1 and R2 are connected to a single rheostat adjusting handle and in adjusting the speed downward, all the resistance in rheostat M is shunted out at the motor field circuit before the resistance in rheostat G is inserted in the generator field circuit. Similarly a separate adjusting handle controls the resistance in the motor and generator fields during travel in the cut direction when contacts C1 and C2 are closed.

When the Auto. ret. switch is released, it takes position shown in the diagram, and contacts R5 which are now open, prevent solenoid C from also becoming energized. The releasing of the Auto. ret. button has no effect on the operation of the table, because solenoid AR established its own holding circuit when contacts AR1 closed.

When the return limit switch is opened by action of the table dog, solenoid R becomes deenergized causing all contacts R with a numeral to take the position of their spring bias including contacts R5, which immediately energizes solenoid C, causing all contacts C with a numeral to close. This reverses the direction of current in the generator field and causes the motor to reverse its direction and to run at the speed predetermined by the setting of the cut rheostat.

To stop the table drive motor, it is necessary to depress momentarily the stop switch depriving solenoid AR of current and interrupting its holding circuit by the opening of contacts AR1.

It will be observed that contacts AR4 and AR5 render the Inch res. ineffective when the motor is running on automatic operation, that is, when solenoid AR is energized. When AR is deprived of current contacts AR5 render rheostat G ineffective and the inch resistance causes the generator to supply energy to the motor at a fixed voltage and contacts AR6 render rheostat M ineffective, putting full field strength on the planer motor. Thus when either the Inch cut or the Inch ret. switch is depressed, the planer motor operates at a predetermined moderate speed best suited for checking tool settings. When the Inch cut (or Inch ret.) button is released the motor stops, and it is necessary and desirable that it should do so.

When the motor is in automatic operation between the limits as determined by the setting of the table dogs and at the speeds preselected by the setting of rheostat M and rheostat G and if the manually operated switch marked Slow I is depressed, solenoid SD is deprived of current causing contacts SD1 to close, thereby shunting out rheostat M. Contacts SD2 open thereby causing all the resistance in rheostat G to be inserted in series with the generator field. These are the circuit conditions which cause the motor to operate at its slowest speed at which stability can be assured. When the Slow switch is released, its contacts close, solenoid SD becomes energized, and the same circuit conditions which prevailed prior to the slow down operation are restored.

Commercial planer controllers are usually provided with additional control devices, designed to afford overload protection, under voltage protection, more rapid acceleration and deceleration and to inhibit creeping due to residual magnetism in the generator field. These various devices are well known in the art, and inasmuch as they have no bearing on my invention they are not herein described.

Since variable speed electric drives, from a mechanical point of view, such as are employed in connection with my invention, are well known and in use, it has not been deemed necessary to show the mechanical structure of the solenoids, the switches and the connections from the solenoid armatures which enable them to operate the noted switches. This connection may be mechanical direct to the operating devices of the switches, or to relay switches which operate solenoids which in turn operate the switches. The Slow switch and solenoid SD together with the switches SD1 and SD2 and such shifts in the wiring to the rheostats for the planer motor and the generator field as may be required to cause said switches to function as they do, constitute my improvement. Otherwise the hook up is known and in general use for metal planers.

It is of importance that the operation of the Slow switch be available to the machine operator at his station before the machine and hence it is my practive to mount this switch on the pendant where it also carries the other manual switches of the hook up.

The Slow switch, of course, is in operation to deenergize the solenoid in the hook up shown only so long as the switch is depressed. It would be practical, for example, to change the relation of the two switches SD1 and SD2 so that SD1 is a normally open switch and switch SD2 is a normally closed switch and arrange the Slow switch so that it makes a circuit instead of breaking the circuit to solenoid SD. In the diagram this modification would merely require a showing of the switch marked Slow in a position normally spaced above the two dimensional dots and place the diagonal line or switch SD2 and eliminate it from switch SD1.

The selected basic circuit for the variable motor drive of a machine tool such as a planer consists of a motor generator set, which supplies power to the machine tool drive motor at a variable voltage and where the field of the motor is supplied from an independent source which may or may not be capable of variation. Other sources of variable voltage may be used for controlling motors on machine tools, such as electronic tubes and obviously my invention can be applied to any type of planer control, having wide speed range obtainable by varying the voltage of the direct current source which supplies the planer drive motor. It is not necessary to illustrate my invention in connection with other hook ups since the essential idea is to control the field strength of the motor and the voltage applied to the armature of the motor so as to slow down the speed of both without disenabling the electrical controls for automatic operation except for the interval that the switches are manually held in operative position for the slow down operation. The particular hook up shown, however, lends itself well to the application of my invention.

Having thus described my invention by example which illustrates the inventive instruction, what I claim as new and desire to secure by Letters Patent is:

1. In a control for a variable speed reversing drive for a machine tool including a direct current source, said drive including a machine tool motor and an automatic reversing drive set of connections and circuit control, means for starting automatic operation; manual switch means constantly biased toward inactive position for causing slow operation coupled with electro-magnetic means and switch means for by-passing the normal automatic reversing drive connections whereby the same may remain in effect during the operation of the manual means.

2. In a control for a variable speed reversing drive for a machine tool including a direct current source, said drive including a machine tool motor and an automatic reversing drive set of connections, a manually operated switch constantly biased toward inactive position and having connections for modifying the voltage applied to the armature of the motor so as to produce slow operation, said connections by-passing the normal automatic reversing drive connections whereby the same may remain in effect, during the operation of the manually operated switch.

3. In a control for a variable speed reversing drive for machine tools including an automatic reversing drive set of connections, said drive including a variable voltage direct current source, a machine tool motor, a manually controlled switch having connections constituting means for increasing the field strength of the motor, coupled with means for reducing the voltage applied to the armature of the motor so as to produce the slowest possible operation of the motor, said connections by-passing the normal automatic reversing drive connections of said hook-up whereby the same may remain in effect during the operation of the manually controlled switch.

4. The combination of claim 3 in which the connections serve to reduce a resistance in the circuit of the planer motor field and increase the resistance in the circuit of the field of the generator which supplies the variable voltage.

5. The combination of claim 3 in which the connections serve to short-circuit the resistance in effect during automatic drive in the planer motor field, and to break the circuit from the automatic drive connections to the resistance in the field of the generator constituting the motor armature supply.

6. The combination set forth in claim 1 in which the inching drive connections are included in the set of driving connections.

JOHN E. DORAN.

REFERENCES CITED

The following references are of record in the file of this patent:

UNITED STATES PATENTS

| Number | Name | Date |
|---|---|---|
| 1,514,881 | Van Norman | Nov. 11, 1924 |
| 1,651,889 | Hepperlen | Dec. 6, 1927 |
| 2,322,637 | King et al. | June 22, 1943 |
| 2,330,993 | Perrine et al. | Oct. 5, 1943 |